(12) United States Patent
Elliot et al.

(10) Patent No.: US 8,011,269 B2
(45) Date of Patent: Sep. 6, 2011

(54) ACTUATOR

(75) Inventors: Andrew James Elliot, Victoria (AU); Wayne Andrew Harris, Victoria (AU)

(73) Assignee: Capro Ltd., Willis, TX (US)

( * ) Notice: Subject to any disclaimer, the term of this patent is extended or adjusted under 35 U.S.C. 154(b) by 1361 days.

(21) Appl. No.: 11/399,473

(22) Filed: Apr. 7, 2006

(65) Prior Publication Data
US 2007/0235271 A1    Oct. 11, 2007

(51) Int. Cl.
*F16C 1/12* (2006.01)
*B60N 2/66* (2006.01)

(52) U.S. Cl. .................. 74/501.6; 74/421 R; 297/284.4

(58) Field of Classification Search ............... 74/421 R, 74/500.5, 501.5, 501.6, 505 R; 297/284.2, 297/284.1, 284.7
See application file for complete search history.

(56) References Cited

U.S. PATENT DOCUMENTS

| | | | | |
|---|---|---|---|---|
| 4,940,284 A | * | 7/1990 | Nagasaka | 297/284.4 |
| 5,199,310 A | | 4/1993 | Yoshimura | |
| 5,797,652 A | * | 8/1998 | Darbyshire | 297/284.4 |
| 6,997,847 B2 | | 2/2006 | Liu | |
| 7,395,733 B2 | | 7/2008 | Liu | |
| 2006/0163924 A1 | * | 7/2006 | Liu | 297/284.4 |
| 2008/0148889 A1 | | 6/2008 | Elliot et al. | |

* cited by examiner

*Primary Examiner* — Vinh T Luong
*Assistant Examiner* — Thomas Diaz
(74) *Attorney, Agent, or Firm* — Baker & Hostetler LLP

(57) ABSTRACT

An actuator has a rotatable input member coupled to a drive member such that rotation of the rotatable input member under an input load causes rotation of the drive member on a first axis. The drive member is coupled to a driven member such that rotation of the drive member causes rotation of the driven member on a second axis which is laterally offset from the first axis. A coupling between the drive member and the driven member is arranged to provide a rotational reduction from the drive member to the driven member. The driven member is arranged for connection to a wire of a Bowden cable having a sleeve seatable in relation to a housing for the actuator such that rotation of the driven member causes extension or retraction of the cable. The braking means exerts a braking load on a braking surface of the actuator which is fixed relative to the housing and the braking means is arranged for cooperation with the drive member such that when a backdriving load is exerted through the Bowden cable wire to the driven member, tending to cause the driven member to rotate the drive member, the drive member cooperates with the braking means to increase the braking load to resist rotation of the drive member.

7 Claims, 8 Drawing Sheets

ACTUATOR

FIELD OF THE INVENTION

This invention relates to an actuator which is suited for the actuation of lumbar supports employed in vehicle seats, such as in aircraft, waterborne vehicles and land vehicles. It will be convenient to describe the invention in relation to its use as a lumbar support actuator, but it should be appreciated that an actuator according to the invention could be employed in other fields.

BACKGROUND OF THE INVENTION

It is well known to provide adjustable lumbar supports in vehicle seats. Various different forms of adjustable lumbar supports exist and variation occurs both in the lumbar supports themselves and in the actuators that enable lumbar support adjustment.

Some manual actuators for lumbar supports include a rotatable knob which can be rotated both clockwise and anticlockwise, in order to increase or decrease the extent of lumbar support. In some forms of this type of actuator, the mechanism of the actuator includes a braking function, to brake the actuator against backdriving from an adjusted position. The force applied to rotate the knob must be large enough both to overcome the braking load, as well as to perform the lumbar support adjustment. Because of this, the knob can be difficult to rotate. That difficulty can be accentuated as the knob is usually located in a confined position, such as on the side of the seat back, between the seat and the vehicle door frame.

Some lumbar support actuators are bulky, which can limit the seat designs with which they can be used. Also, many actuators require several revolutions of the knob to adjust the lumbar support between extreme positions.

SUMMARY OF THE INVENTION

Some embodiments of the present invention provide an improved actuator which is simple and easy to produce.

According to the one embodiment of the present invention, there is provided an actuator including a housing and, within the housing: a rotatable input member; a drive member; a driven member; and braking means, wherein the rotatable input member is coupled to the drive member such that rotation of the rotatable input member under an input load causes rotation of the drive member on a first axis. The drive member is coupled to the driven member such that rotation of the drive member causes rotation of the driven member on a second axis which is laterally offset from the first axis, and the coupling between the drive member and the driven member is arranged to provide a rotational reduction from the drive member to the driven member. The driven member is arranged for connection to a wire of a Bowden cable having a sleeve seatable in relation to the housing such that rotation of the driven member causes extension or retraction of the wire. The braking means exerts a braking load on a braking surface of the actuator which is fixed relative to the housing and the braking means is arranged for cooperation with the drive member, the cooperation being such that when a backdriving load is exerted through the Bowden cable wire to the driven member, tending to cause the driven member to rotate the drive member, the drive member cooperates with the braking means to increase the braking load to resist rotation of the drive member.

An actuator according to some embodiments of the present invention advantageously can be assembled with relatively few parts. Thus the cost of an actuator according to the invention can be lowered by virtue of lesser components and greater ease of assembly. Also, the ease of actuation of the actuator according to the invention is able to be improved.

In some embodiments of the invention, both the drive member and the rotatable input member are arranged for cooperation with the braking means. The cooperation between the rotatable input member and the braking means is such that upon an input load being applied to the rotatable input member, the braking load exerted on the braking surface is reduced. The resistance to rotation of the rotatable input under an input load is reduced so that a reduced effort to rotate the rotatable input is achieved, compared to the effort required if the braking load exerted by the braking means was not reduced. This reduction of the braking load is important when the actuator is to be employed for lumbar support adjustment and is awkward to access, as the ease with which the rotatable input can be rotated is an important characteristic.

The braking means can be a suitable brake or clutch arrangement in which the braking load can be increased under a backdriving load, so that unintended adjustment is avoided. In one form, the braking means comprises a curved spring. The spring can be a penannular band, or it can be a coil spring which preferably comprises two or more turns. The spring will be manufactured of spring metal, which can resiliently adjust to expand or contract its radius of curvature.

A braking means in the form of a resilient penannular band, or in the form of a coil spring, preferably defines spaced-apart turned end portions. The arrangement is such that, upon rotation of the drive member when a backdriving load is experienced, the drive member cooperates with one of the spring end portions depending on the direction of rotation of the drive member. In this arrangement, the cooperation between the drive member and the end portions is such as to cause the band or spring to increase its radius of curvature and thus to increase the braking load against the braking surface. Preferably the end portions extend inwardly from the braking surface for engagement by the drive member.

The drive member is preferably coupled to the driven member by a geared coupling, most preferably by a spur gear coupling. The drive member may include a first spur gear coaxially with the rotatable input such as a toothed spindle which extends coaxially from the rotatable input for meshing engagement with a gear portion of the driven member. The driven member can include a fully circular second spur gear although, in one preferred form of the invention, the driven member has a part circular second spur gear. In that form, the part circular spur gear may extend through an arc of about 120°. The arcuate extent of the second spur gear on the driven member is related to the extent of travel which is required between the wire and sleeve of a Bowden cable and therefore the spur gear can extend arcuately a lesser or greater amount than 120°, such as from 100° to 140°.

A helical gear arrangement could alternatively be employed, particularly if noise and backlash are to be minimised. Still alternatively, a geared connection could be replaced with a belt and pulley connection, for example one using a toothed belt operable between sprockets.

The drive member preferably has three portions, comprising a first portion for coupling to the rotatable input member, a second portion for coupling to the driven member and a third portion which is disposed between the first and second portions, for cooperation with the braking means. In some embodiments of the invention, the first, second and third portions have a common axis and that the third portion is a generally circular disc having major surfaces normal to the common axis. In this form of drive member, an abutment means can extend from one major surface of the disc for cooperation with the braking means, such as at a peripheral edge of the disc. The abutment means preferably extends beyond the outer periphery of the disc.

The abutment means can define a pair of abutment surfaces which face generally away from each other and which are spaced from each other circumferentially of the disc and are arranged to be positioned between inwardly extending end portions of a spring forming the braking means. The circumferential spacing between the abutment surfaces and a respective inwardly extending spring end portions, in a rest position of the drive member, should be small. This is so that only a small amount of rotation of the drive member under a backdriving load, will result in one of the abutment surfaces engaging one of the spring end portions to cause the spring to flex and increase its radius of curvature and thereby to increase the braking load against the braking surface for resisting the backdriving load.

The rotatable input member can also include abutment means which defines a pair of circumferentially spaced abutment surfaces which face circumferentially towards each other and between which the abutment means of the drive members is receivable. By this arrangement, each spring end portion is positioned between two opposing abutment surfaces each of which is defined by a respective abutment means. Accordingly, when an input load is applied to the input member, one of the abutment surfaces of the input member will engage one of the spaced-apart end portions of the spring, to contract the radius of curvature of the spring and thereby to reduce the braking load against the braking surface. The abutment faces of the rotatable input member can likewise be positioned close to the spring end portions, for the same reason that only a small rotation of the rotatable input member will bring an abutment surface into engagement with the one spring end portion to contract the spring.

The close spacing of the opposing abutment surfaces of the respective abutment means of the drive member and the rotation input member thus results in only a small rotational movement of either of the drive member or the rotational input member for engagement of the spring portion end to be achieved. In some embodiments of the invention, the rotational movement is not more than 4° to 10°, and in some embodiments from 4° to 6°.

It should be appreciated, that expansion or contraction of the radius of curvature of the spring is dependent on the load applied to the actuator. An input load will drive the input member to engage the spring in a manner which causes the spring to flex to reduce its radius of curvature, while a backdriving load will cause the drive member to engage the spring in a manner which causes the spring to flex to expand its radius of curvature.

It is not necessary that the braking load be completely reduced to allow the rotatable input and the drive member to rotate under an input load. In some instances, it may be desired that the reduction in the braking load be as large as possible, but it may be acceptable for a small residual braking load to be maintained in the spring so that the spring slips against the braking surface upon rotation of the rotatable input member under the influence of an input load.

Optionally, the actuator includes stop means to stop rotation of the rotatable input member after a predetermined amount of rotation in either direction. For example, the rotation could be terminated at each of extreme positions for a full range of required lumbar support adjustment. In the preferred arrangement, the rotatable input member is rotatable through about two revolutions thereof in achieving that full range.

BRIEF DESCRIPTION OF THE DRAWINGS

For a better understanding of the invention and to show how it may be performed, embodiments thereof will now be described, by way of non-limiting example, with reference to the accompanying drawings, in which.

DETAILED DESCRIPTION OF THE PREFERRED EMBODIMENTS

Figure 1:
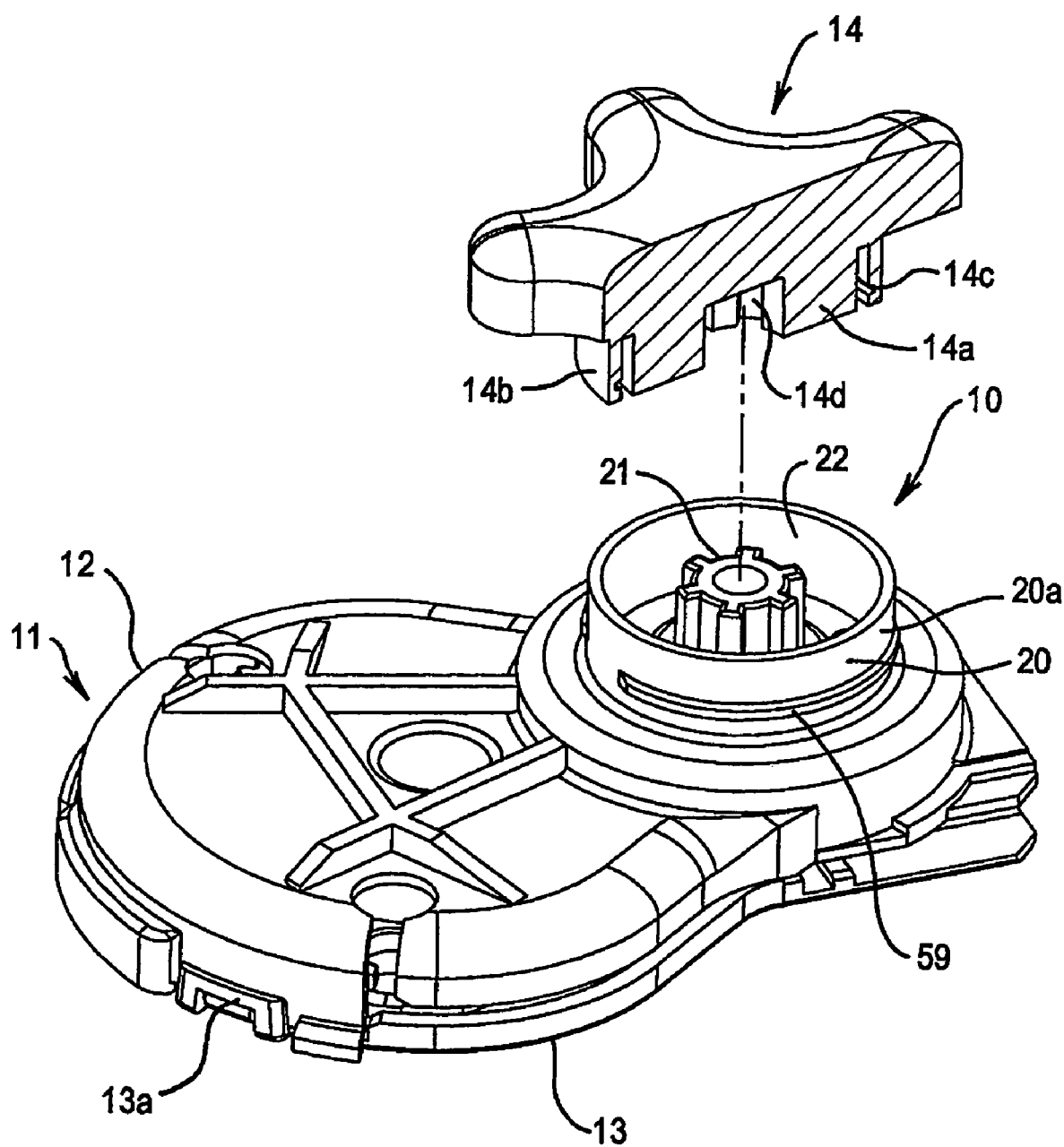
FIG. 1 is a perspective view of an actuator according to one embodiment of the invention.
Figure 2:
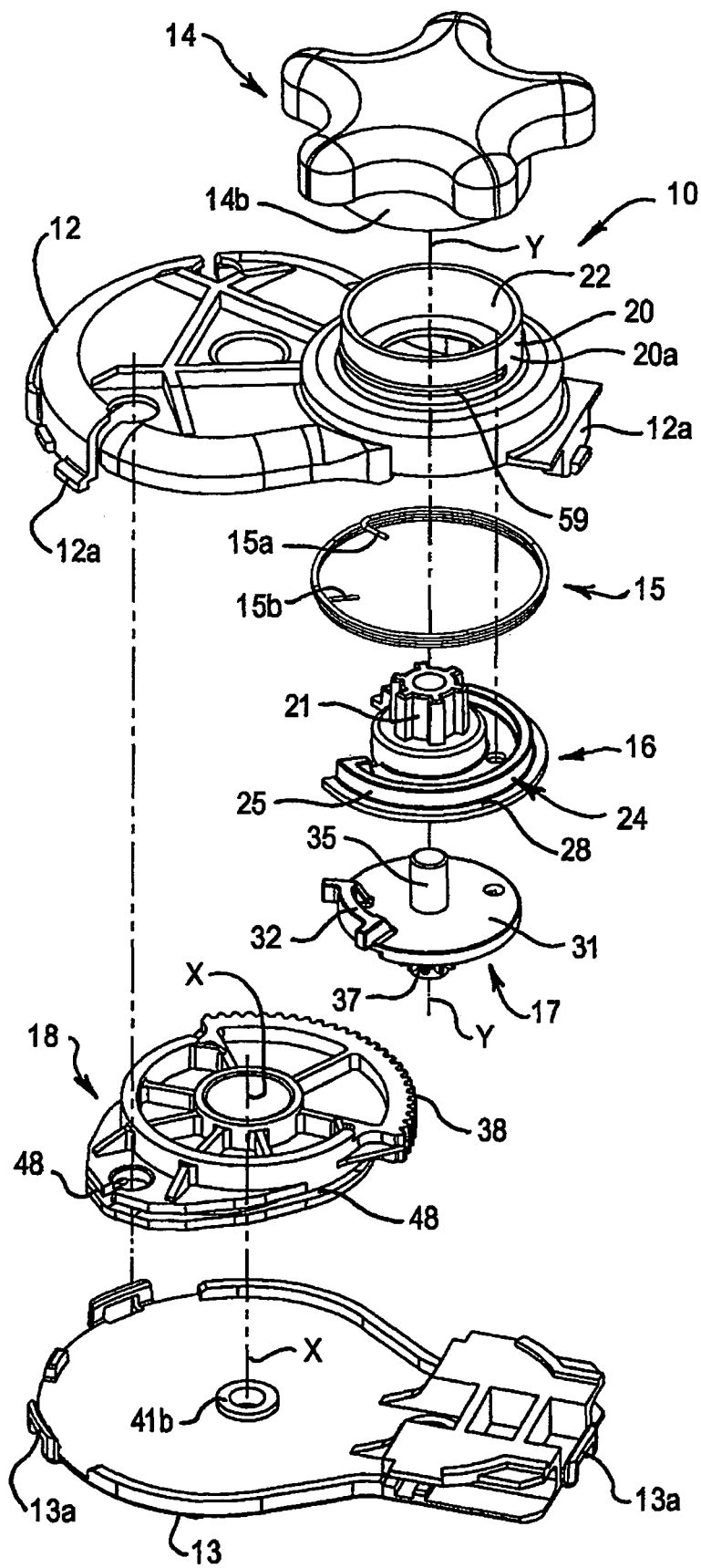
FIG. 2 is an exploded view of the actuator of FIG. 1.
Figure 3:
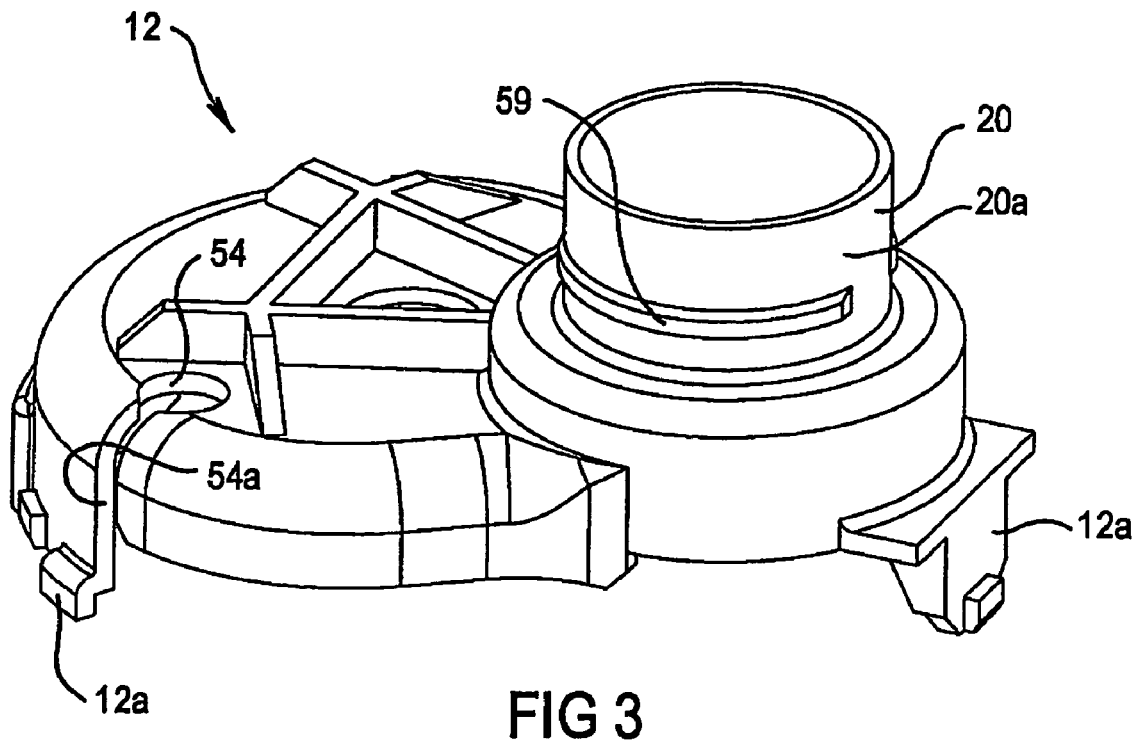
FIGS. 3 and 3(a) show upper and lower perspective views, respectively, of an upper housing part of the actuator of FIG. 1.
Figure 3A:
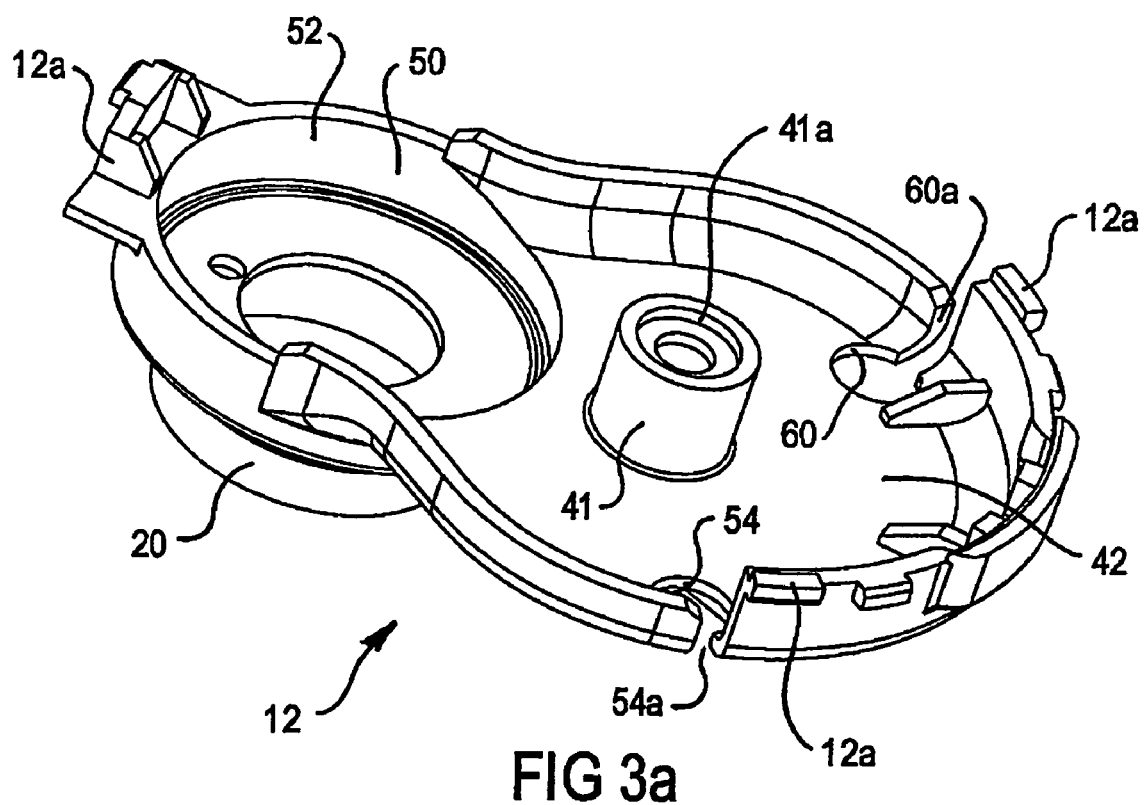
Figure 4:
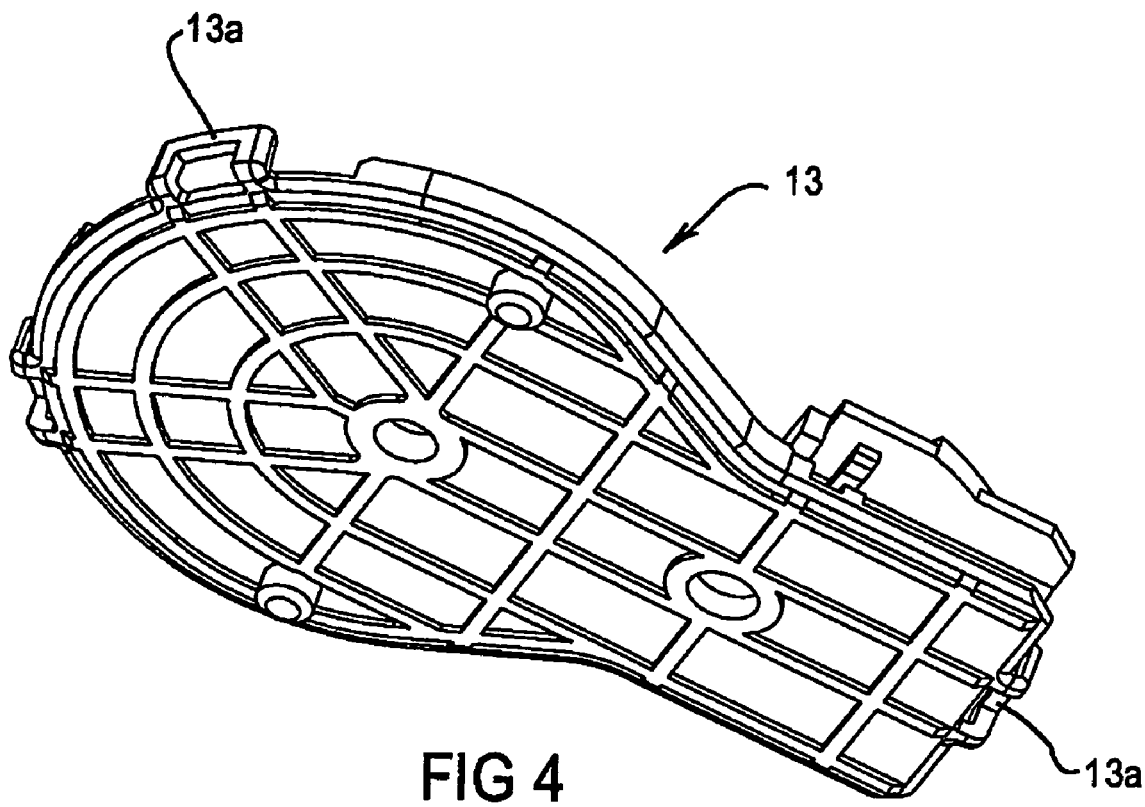
FIGS. 4 and 4(a) show upper and lower perspective views, respectively, of a lower housing part of the actuator of FIG. 1.
Figure 4A:
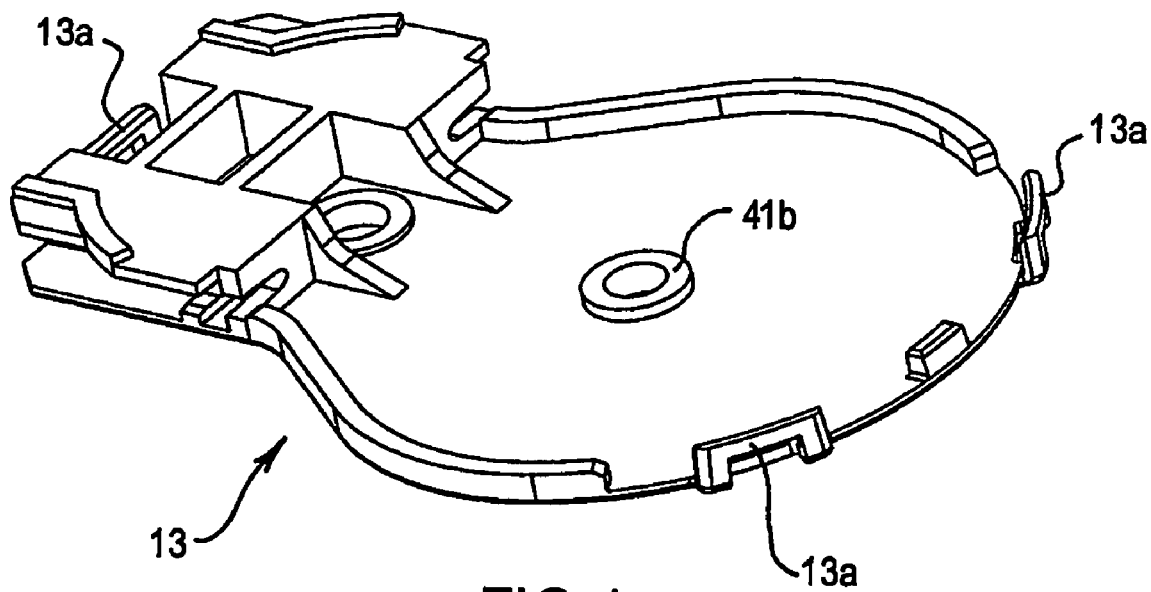
Figure 5:
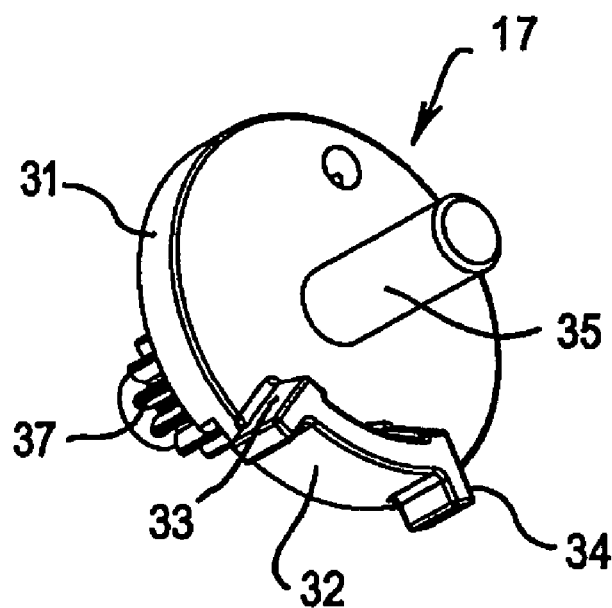
FIGS. 5 and 5(a) show upper and lower perspective views, respectively, of a drive member of the actuator of FIG. 1.
Figure 5A:
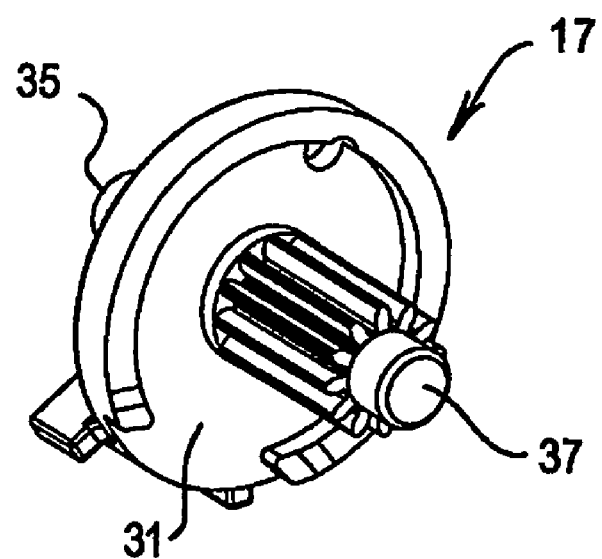
Figure 6:
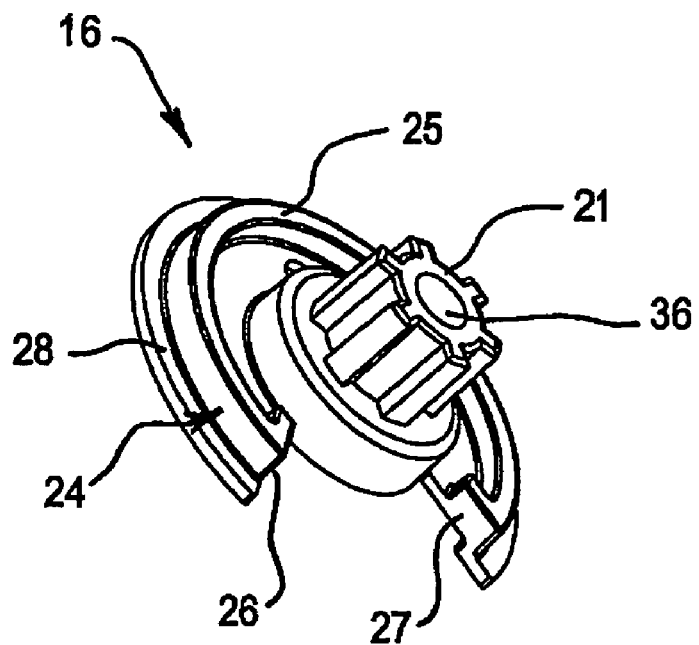
FIGS. 6 and 6(a) show upper and lower perspective views, respectively, of an input member of the actuator of FIG. 1.
Figure 6A:
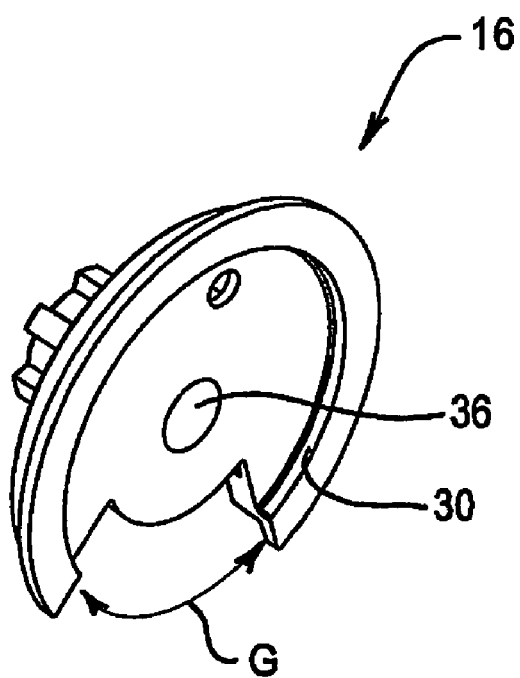

FIG. 1 shows an assembled actuator 10, while FIG. 2 is an exploded view of actuator 10, showing individual components. The actuator 10 has a housing 11 which includes an upper housing part 12 and a lower housing part 13. The housing parts 12 and 13 connect together by interconnection of snaplock tabs 12a of part 12 into receiving tabs 13a of part 13.

The actuator 10 includes a manually rotatable handle or knob 14 (shown partly broken away in FIG. 1) and, within housing 11, a spring brake 15, a rotatable input member 16, a drive member 17 and a driven member 18. Apart from the handle 14 and the spring brake 15, each of these parts is illustrated separately in two views in FIGS. 3 to 7.

The upper housing 12 includes a cylindrical portion 20 which accommodates a hollow, upper splined extension 21 of the rotatable input member 16. The splined extension 21 of the input member 16 is spaced from the internal wall 22 of the cylindrical portion 20 so that an internally splined, inner sleeve 14a of the actuating knob 14 can be inserted into the cylindrical portion 20 and engage the splined extension 21. Thus, by manual rotation of knob 14, input member 16 is rotatable.

The spring brake 15 is a coil spring, and each end portion 15a and 15b of the spring 15 is bent to extend inwardly. The spring 15 has a diameter sufficient to fit around a surface 24 of an upstanding part annular wall 25 of the input member 16. The spring 15 is arranged so that the end portions 15a and 15b extend inwardly in front of a radial surface of a respective abutment 26 and 27 (FIG. 6) at each end of the wall 25. The input member 16 includes a flange 28 around wall 25 to support the spring 15.

The input member 16 defines, on an underside thereof, a recess 30 within the depth of flange 28 and in which a portion of the drive member 17 is received. The configuration of the input member 16 is such that a circular disc 31 of the drive member 17 is a loose rotatable fit within the recess 30. Moreover the circumferential gap G between the end faces 26 and 27 of the input member 16 is more than sufficient to accommodate an abutment 32 on disc 31 of the drive member 17, with each of end abutment surfaces 33 and 34 of the abutment 32 being opposed to but closely spaced apart from the end surfaces 26 and 27, respectively, so that each spring end portion 15a and 15b can be loosely positioned between a respective one of opposed surface pairs 26, 33 and 27, 34.

The drive member 17 has a spindle 35. The spindle 35 is accommodated within a bore 36 formed in the splined end 21 of the input member 16 and thereby enables accommodation of the disc 31 within the recess 30. The drive member 17 thus nests coaxially with the input member 16.

Projecting from the major face of the disc 31 remote from the spindle 35, drive member 17 has a splined shaft 37. The shaft 37 extends coaxially with the spindle 35 and the shaft 37 is arranged for toothed engagement with a spur gear 38 formed on the driven member 18. The driven member 18 defines a bore 40 in which is received a boss 41 which projects from the inner surface 42 of the upper housing part 12. The lower end of boss 41 is recessed at 41a so as to locate on annular bead 41b of lower housing part 13 when housing parts 12 and 13 are connected together. The driven member 18 is driven to rotate about the axis X-X of boss 41 upon rotation of the drive member 17. The driven member 18 further includes a slotted opening 43 to receive a barrel 44 affixed to the end of an actuating wire 46 of a Bowden cable 47. The driven member 18 further includes a cable groove 48 which extends on either side of the opening 43, to enable wire 46 to extend in a selected one of opposite directions.

Figure 8:
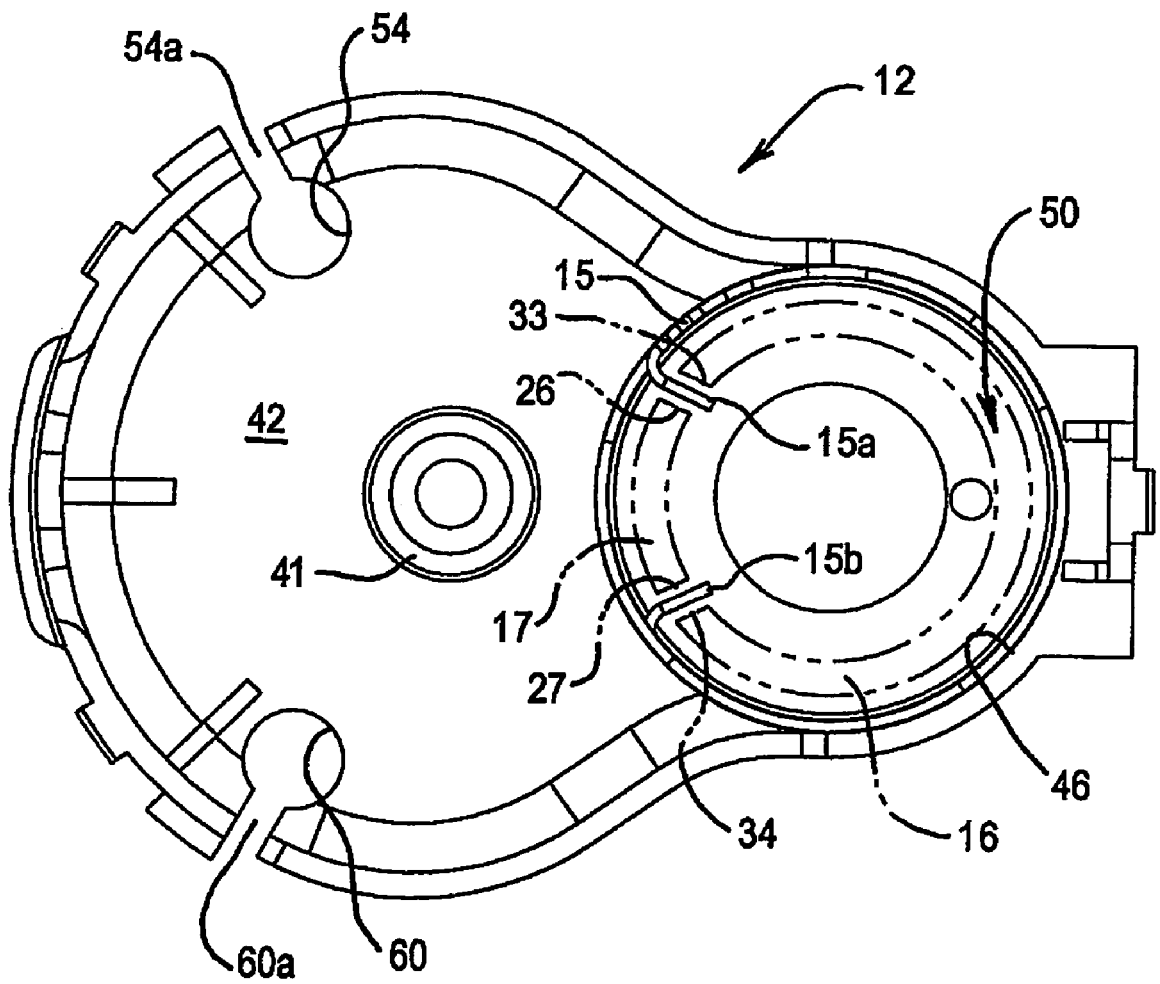
FIG. 8 is an inside perspective view of the upper housing part of FIG. 3(b), showing a projection of the input member and of drive member of FIGS. 5 and 6, and also showing a spring brake of the actuator.

FIG. 8 is a view of the upper housing part 12 which is provided to illustrate the arrangement of the input member 16 and the drive member 17 (both depicted as projections and shown in broken outline), specifically in respect of their interaction with the spring 15. In FIG. 8, the spring 15 is shown accommodated within an annular recess 50 defined by housing part 12. The resilience of spring is such that it is biased to expand into frictional engagement with the peripheral wall 52 of the recess 50. Thus, the natural radius of curvature of the spring 15 must be reduced for the spring to be accommodated in the recess 50.

With the spring 15 accommodated within the recess 50, the spring end portion 15a is positioned respectively between opposed surfaces 26, 33, with spring end portion 15b positioned between opposed surfaces 27, 34. In each case, the respective opposed surfaces are slightly spaced from engagement with the respective spring end portions 15a and 15b.

With the parts of actuator 10 assembled together, driven member 18 is retained on boss 41 and rotatable on axis X-X of boss 41. Also, drive member 17 is nested in input member 16, with its spindle 35 received in bore 36 of extension 21 of input member 16, with disc 31 of drive member 21 located in recess 30 of input member 16 and with abutment 32 between surfaces 26 and 27 of member 16. The extension 21 of member 16 is located coaxially within cylindrical portion 20 of upper part 12 of housing 11, and then inner sleeve 14a of knob 14 is received in portion 20 and makes a splined coupling with extension 21. The spring 15 is located around surface 24 of wall 25 of input member 16, with its ends 15a and 15b located between the opposing respective surfaces as depicted in FIG. 8. The bias of spring 15 generated by its resilience, and the need to reduce the radius of curvature of spring 15 in order for it to be received in recess 50 results in spring 15 frictionally engaging peripheral wall 52 of recess 50. Thus, knob 14, input member 16, drive member 17 and spring 15 have a common axis Y-Y through portion 20, with axis Y-Y substantially parallel to and laterally offset from axis X-X. The offset is such that teeth defined by splined shaft 37 mesh with the teeth of gear 38 on the driven member 18. As will be appreciated, the extension 21 and wall 24 of input member 16, as well as the spindle 35, disc 31 and shaft 37 of drive member 17 all are rotatable on axis Y-Y.

Figure 7:
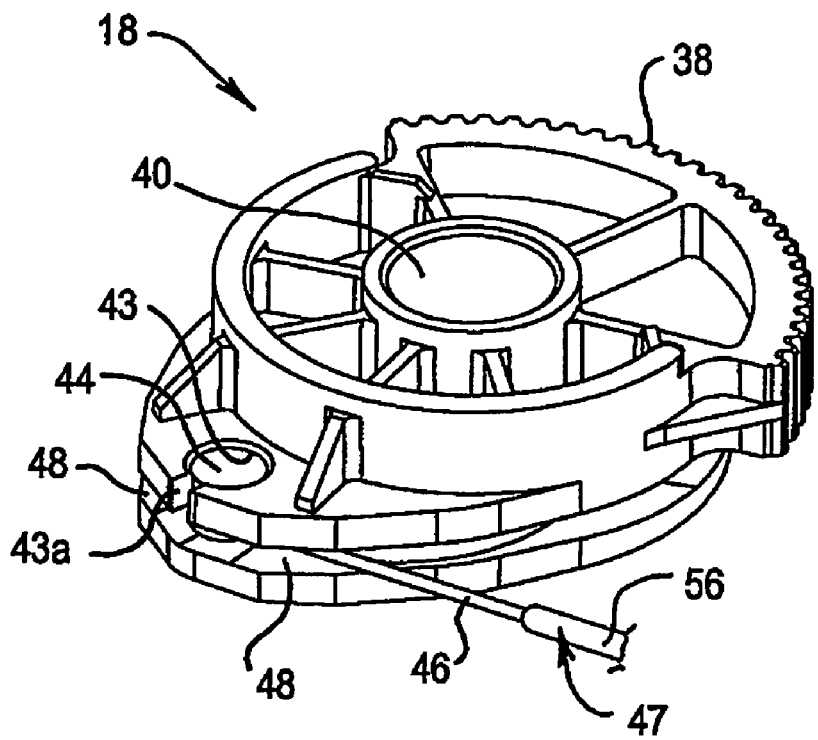
FIGS. 7 and 7(a) show upper and lower perspective views, respectively, of a driven member of the actuator of FIG. 1.

When it is required to secure an end of Bowden cable to actuator 10, it first is appropriate to determine to which of the opposite sides of actuator 10 the Bowden cable 47 is to extend. Assuming that this is as shown in FIG. 7, the driven member 18 is rotated anti-clockwise, as it is viewed in that figure, to locate opening 43 in line with a corresponding opening 54 of upper part 12 of housing 11, to locate the barrel 44 of the wire 46 of Bowen cable 47 in opening 43 of member 18. With the barrel 44 secured, the wire 46 of cable 47 then is able to drop down into the slot 43a of opening 43 and into slot 54a of opening 54 of housing part 12a. The member 18 as viewed in FIG. 7 then is able to be rotated clockwise to draw the wire longitudinally from sleeve 56 of cable 47, along groove 44, with the end of sleeve 56 seating against the side of housing 11.

The operation of the actuator 10 is as follows. If it is desired to adjust a lumbar support to which the actuator 10 is connected by a Bowden cable which extends from the driven member 18, rotational input load is applied to the input member 16, specifically to the splined end 21 by knob 14. That input load, applied in either a clockwise or an anti-clockwise direction, causes the input member 16 to rotate. For the purposes of illustration, it will be assumed that the input load imparts a clockwise rotation to the input member 16. Thus, the end surface 27 of the input member 16 will move into engagement with the spring end portion 15b. Continued rotation of the input member 16 will cause the spring end portion 15b to shift in the same direction of rotation. The spring 15 will not itself initially commence rotation, because it is in frictional engagement with the peripheral wall 52 of the recess 50. However, by shifting the spring end portion 15b in the direction of rotation, there will be a reduction in the frictional load between the spring 15 and the recess wall 52 due to movement of end portion 15b tightening the coil of spring 15 and thereby reducing its radius of curvature. Thus, there will be a reduction in the resistance to rotation of spring 15 relative to the recess 50, so that the effort required to rotate the input member 16 is lower than if it was necessary for the input load to also overcome the full frictional load between the spring 15 and the recess wall 52.

Continued rotation of the input member 16 will further shift the spring end portion 15b to further maintain the reduction in the frictional load between spring 15 and the recess wall 52. Also, the continued rotation will shift the end 27 of the input member 16 toward the facing abutment surface 34 of the drive member 17. The arrangement can be such that the surfaces 27 and 34 abut, or that the surfaces 27 and 34 do not abut, but instead that they sandwich the spring end portion 15b between them. Whichever arrangement is employed, continued rotation will cause the spring 15 to slip against the recess wall 52 and the drive member 17 to rotate. As a consequence, the meshing spur gears comprising splined shaft 37 of member 17 and gear 38 of member 18, will cause the driven member 18 to rotate anti-clockwise. The driven member 18 thus will cause the wire 46 of the Bowden cable 47 to thereby move longitudinally to retract into sleeve 56 the Bowden cable. The input member 16 can continue to be rotated until the lumbar support has been properly adjusted and further rotation is then discontinued.

Once the desired adjustment has been made to the lumbar support, the present invention is adapted to resist backdriving load through the Bowden cable wire 46. A backdriving load may occur simply because the lumbar support has a natural tendency to return to a preadjusted or relaxed condition, or it may be that pressure applied by the vehicle occupant, by sitting in the vehicle seat, causes the lumbar support to impart a backdriving load through the wire 46 to the driven member 18. Thus the tendency under a backdriving load is for the driven member 18 to rotate clockwise and that would allow the cable wire 46 to shift from its previously set position and the lumbar support would be adjusted unintentionally. However, the actuator 10 prevents rotation of the driven member 18 under a backdriving load up to a limit beyond loads encountered in normal use with a lumbar support. That prevention occurs by spring 15 braking the drive member 17 against rotating under a backdriving load that acts on the driven member 18.

Assuming that a backdriving load applied to the driven member 18 causes it to rotate clockwise relative to its orientation in FIG. 7, the tendency will be for the drive member 17 to rotate anti-clockwise. Thus, the abutment 32 will also rotate in an anti-clockwise direction and that will cause the abutment surface 34 of the abutment 32 to engage the spring end portion 15b of the spring 15. Continued anti-clockwise rotation of the drive member 17 will cause opposite movement of the spring 15 to that described above for an input load which rotates the input member 16 clockwise. That is, the abutment 32 will expand the spring 15 into more firm engagement with the recess wall 52 of the recess 50 within which the spring 15 is disposed. That more firm engagement brakes the drive member 17 against rotation and, because the drive member and driven member 18 are coupled together, rotation of the driven member 18 is also resisted.

One advantage found in some embodiments of the invention is that the direction of the input load to the input member 16 in either clockwise or anti-clockwise direction, will cause a reduction in the braking load between the spring 15 and the recess wall 52, because in either direction, one of the spring end portions 15a and 15b will be engaged by a respective end surface 26 and 27 of the input member 16. Likewise, a backdriving load will be resisted regardless of whether that load influences the driven member 18 to rotate in a clockwise or anti-clockwise direction, because in either direction of rotation, the abutment 32 of the drive member 17 will engage one of the spring end portions 15a and 15b, and that engagement in either direction will cause an increased braking load to be applied by the spring 15 to the recess wall 52.

It will be appreciated that an input load which is applied to the input member 16 to drive the driven member 18 to retract a cable connected thereto, will have to be sufficient to overcome any residual backdriving load that already is present in the Bowden cable 47. Advantageously, the invention provides for a geared reduction between the drive member 17 and the driven member 18, so that the input load is multiplied through to the driven member 18. Moreover, the invention can employ a gear arrangement of very high efficiency, in contrast to prior art lumbar support actuators in which resistance to backdriving is provided by low efficiency screw mechanisms. In that form of prior art actuator, the input load must be sufficient to overcome the braking load in such a screw mechanism and this can significantly increase the input load which is required to be applied. In some embodiments of the invention, a spur gear arrangement between members 17 and 18 provides a reduction of about 6:1.

The outer surface 20a of the cylindrical portion 20 of upper housing 12 includes a raised, arcuate bead 59 which is arranged to cooperate with a circumferential groove 14c formed in the interior surface of outer cylindrical skirt 14b of a knob 14. The recess is intended to receive the bead 59 to locate the knob 14 over the portion 20. The knob 14 further includes a bore having splines 14d, defined within inner sleeve 14a, which is complementary to the splines of the splined end 21, so that rotation of the knob 14 causes rotation of the input member 16.

In the assembled form of the actuator 10 shown in FIG. 1, a compact actuator is provided. Moreover, the geared coupling between the drive member 17 and the driven member 18 can be arranged so that only two turns of the drive member 17 are required for full rotational travel of the driven member 18. This compares very favorably with other known actuators, in which up to five turns are required.

Figure 7A:
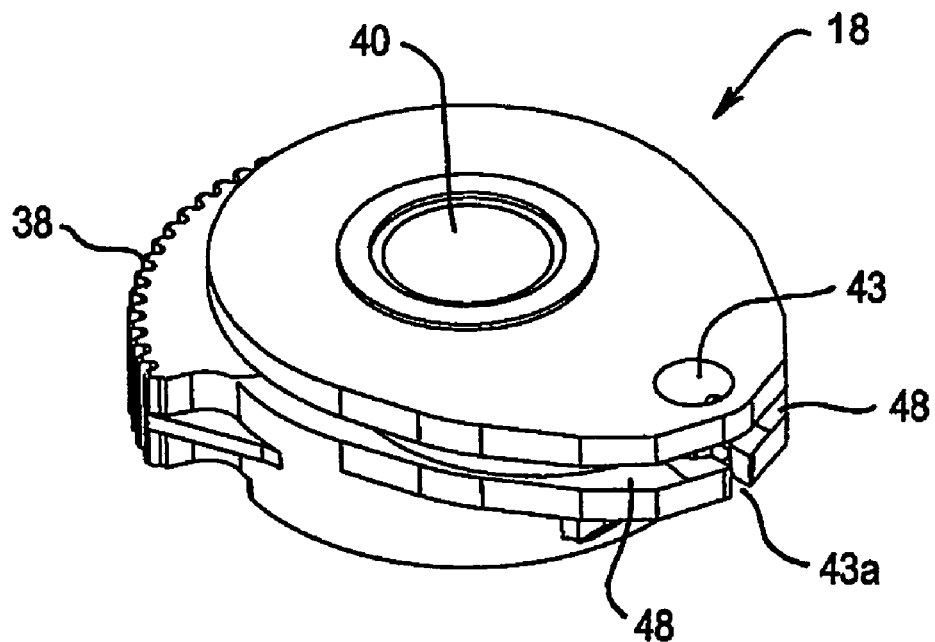

The gear ratio of about 6:1 between members 17 and 18 assist in enabling about two turns of the drive member to achieve sufficient rotational travel of the driven member. In this regard, sufficient travel means travel which is sufficient to provide a required range of relative longitudinal movement between wire 46 and sleeve 56 of Bowden cable 47. The form of driven member 18 assists in these regards since, as shown in FIGS. 7 and 7(a), the slotted opening 43 in the driven member 18 is located symmetrically with respect to the arcuate extent of spur gear 38. Also, the centre of opening 43 is spaced beyond the centre of curvature of gear 38 by a distance greater than the radius of gear 38, such as by an amount of 10 to 20%, in some embodiments about 15%, of the radius of gear 38. Also, with respect to the axis X-X, the radius of groove 48 varies from a maximum greater than the radius of gear 38 to a minimum less than the radius of gear 38. The maximum radius of groove 48 is through the centre of opening 43, while the minimum radius is 120° to each side of the centre of opening 43. This variation in the radius of groove 48 is to create variation in the rate of cable traverse with respect to the rate of input rotation. The arrangement causes the cable to travel more quickly at minimum cable extension and less quickly as it approaches maximum cable extension to achieve a more uniform rate of adjustment, such as of a lumbar support.

It is to be noted that actuator 10 is able to receive the Bowden cable 47 from either of two directions, obviating the need for left and right hand versions of the actuator. Thus, upper housing part 12, in addition to having opening 54, has a second slotted opening 60 which has a slot 60a. The openings 54 and 60 are symmetrically disposed at opposite sides of housing 11, and cable 47 is able to connect to actuator 10 via either of openings 54 and 60.

The embodiments in accordance with the invention described herein is susceptible to variations, modifications and/or additions other than those specifically described and it is to be understood that the invention includes all such variations, modifications and/or additions which fall within the spirit and scope of the above description.

What is claimed is:

1. An actuator comprising:
   a housing, and
   within the housing:
      a rotatable input member;
      a drive member;
      a driven member; and
      a brake,
   wherein:
      the rotatable input member is coupled to the drive member such that rotation of the rotatable input member under an input load causes rotation of the drive member on a first axis,
      the drive member is coupled to the driven member such that rotation of the drive member causes rotation of the driven member on a second axis which is laterally offset from the first axis, and the coupling between the drive member and the driven member is arranged to provide a rotational reduction from the drive member to the driven member, the driven member is arranged for connection to a wire of a Bowden cable having a sleeve seatable in relation to the housing such that rotation of the driven member causes extension or retraction of the cable, the brake exerts a braking load on a braking surface of the actuator which is fixed relative to the housing and the brake is arranged for cooperation with the drive member, the cooperation being such that when a backdriving load is exerted through the Bowden cable wire to the driven member, tending to cause the driven member to rotate the drive member, the drive member cooperates with the brake to increase the braking load to resist rotation of the drive member, and the drive member includes a gear and is coupled to the driven member by meshing engagement between the gear and part of the periphery of the driven member which defines an arcuate gear having a centre of curvature, the driven member defines an opening at which the driven member is arranged for connection to the wire of the Bowden cable with a centre of said opening positioned at a location spaced beyond the centre of curvature of the arcuate gear by a distance greater than the radius of the arcuate gear.

2. An actuator according to claim 1 wherein the periphery of the driven member defines between the opening and an end of the arcuate gear a groove in which the wire of the Bowden cable is able to extend during relative longitudinal movement between the wire and sleeve of the Bowden cable.

3. An actuator according to claim 2, wherein the radius of the groove with respect to the second axis varies from a maximum at the opening defined by the driven member which is greater than the radius of the arcuate gear to a minimum less than the radius of the arcuate gear.

4. The actuator according to claim 2, wherein the driven member defines a respective said groove between the opening and each end of the arcuate gear.

5. The actuator according to claim 4, wherein the radius of each groove with respect to the second axis varies from a maximum at the opening defined by the driven member which is greater than the radius of the arcuate gear to a minimum less than the radius of the arcuate gear.

6. The actuator according to claim 1, wherein the opening defined by the driven member is located symmetrically with respect to the extent of the arcuate gear.

7. The actuator of claim 4, wherein the opening defined by the driven member is located symmetrically with respect to the extent of the arcuate gear.

* * * * *